US011716717B2

(12) United States Patent
Venugopal et al.

(10) Patent No.: US 11,716,717 B2
(45) Date of Patent: Aug. 1, 2023

(54) METHODS AND APPARATUS FOR DOWNLINK RECEIVE BEAM REFINEMENT

(71) Applicant: QUALCOMM Incorporated, San Diego, CA (US)

(72) Inventors: Kiran Venugopal, Raritan, NJ (US); Wooseok Nam, San Diego, CA (US); Arumugam Chendamarai Kannan, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/316,678

(22) Filed: May 10, 2021

(65) Prior Publication Data

US 2021/0392632 A1 Dec. 16, 2021

Related U.S. Application Data

(60) Provisional application No. 63/037,942, filed on Jun. 11, 2020.

(51) Int. Cl.

*H04W 72/044* (2023.01)
*H04B 17/336* (2015.01)
*H04W 72/02* (2009.01)

(52) U.S. Cl.

CPC ........ *H04W 72/046* (2013.01); *H04B 17/336* (2015.01); *H04W 72/02* (2013.01)

(58) Field of Classification Search

CPC ... H04W 72/046; H04W 72/02; H04W 24/10; H04B 17/336; H04B 17/382; H04B 7/088; H04B 7/0695

See application file for complete search history.

(56) References Cited

U.S. PATENT DOCUMENTS

| | | | | |
|---|---|---|---|---|
| 2020/0153581 | A1* | 5/2020 | Tsai | H04B 7/0695 |
| 2021/0152397 | A1* | 5/2021 | Jiang | H04W 72/0493 |
| 2021/0195605 | A1* | 6/2021 | Nilsson | H04B 7/0695 |
| 2021/0211176 | A1* | 7/2021 | Gao | H04B 7/0632 |
| 2021/0281305 | A1* | 9/2021 | Grant | H04W 72/1289 |
| 2021/0321279 | A1* | 10/2021 | Yang | H04B 17/336 |

(Continued)

*Primary Examiner* — Ivan O Latorre
(74) *Attorney, Agent, or Firm* — Procopio, Cory, Hargreaves & Savitch LLP

(57) ABSTRACT

The present disclosure relates to methods and devices for wireless communication including an apparatus, e.g., a UE and/or base station. In one aspect, the apparatus may receive a channel state information (CSI) report configuration via radio resource control (RRC) signaling, the CSI report configuration including at least one of a channel measurement resource (CMR) resource setting, an interference measurement resource (IMR) resource setting, or a report quantity parameter. The apparatus may also determine a downlink receive beam of one or more downlink receive beams based on the CSI report configuration. The apparatus may also communicate with a base station via the downlink receive beam based on the determined downlink receive beam. Additionally, the apparatus may calculate a signal-to-interference-plus-noise ratio (SINR) quantity associated with a plurality of downlink transmit beams. The apparatus may also decode the CSI report configuration.

29 Claims, 9 Drawing Sheets

500
502
504
Determine a CSI report configuration 510
Encode the CSI report configuration 520
Transmit CSI report configuration via RRC signaling 530
CSI report configuration 534
532 Receive CSI report configuration via RRC signaling
540 Decode the CSI report configuration
550 Determine a downlink receive beam based on the CSI report configuration
560 Select downlink receive beam based on the CSI report configuration
570 Calculate a SINR quantity of a plurality of downlink transmit beams
580 Updating a QCL-Type D parameter for one or more downlink resources
590 Communicate via a downlink receive beam based on the determined downlink receive beam
Communication 594
Communicate via a downlink receive beam based on the CSI report configuration 592

(56) References Cited

U.S. PATENT DOCUMENTS

2022/0140960 A1* 5/2022 Gao ...................... H04L 5/0048
370/336
2022/0174712 A1* 6/2022 Zhang ................... H04L 5/0094
2022/0190977 A1* 6/2022 Lee ...................... H04B 17/336
2022/0191726 A1* 6/2022 Matsumura ........... H04L 5/0048
2022/0286175 A1* 9/2022 Matsumura .......... H04B 7/0695
2023/0026501 A1* 1/2023 Li ........................ H04B 7/0695

* cited by examiner

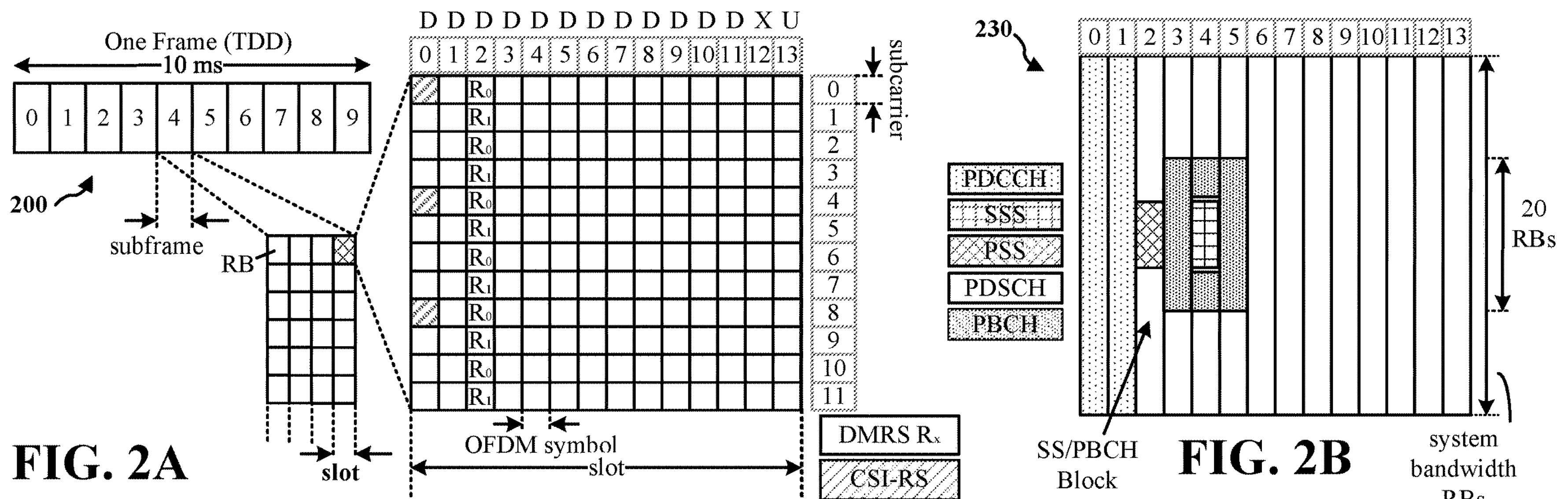
FIG. 2A
FIG. 2B
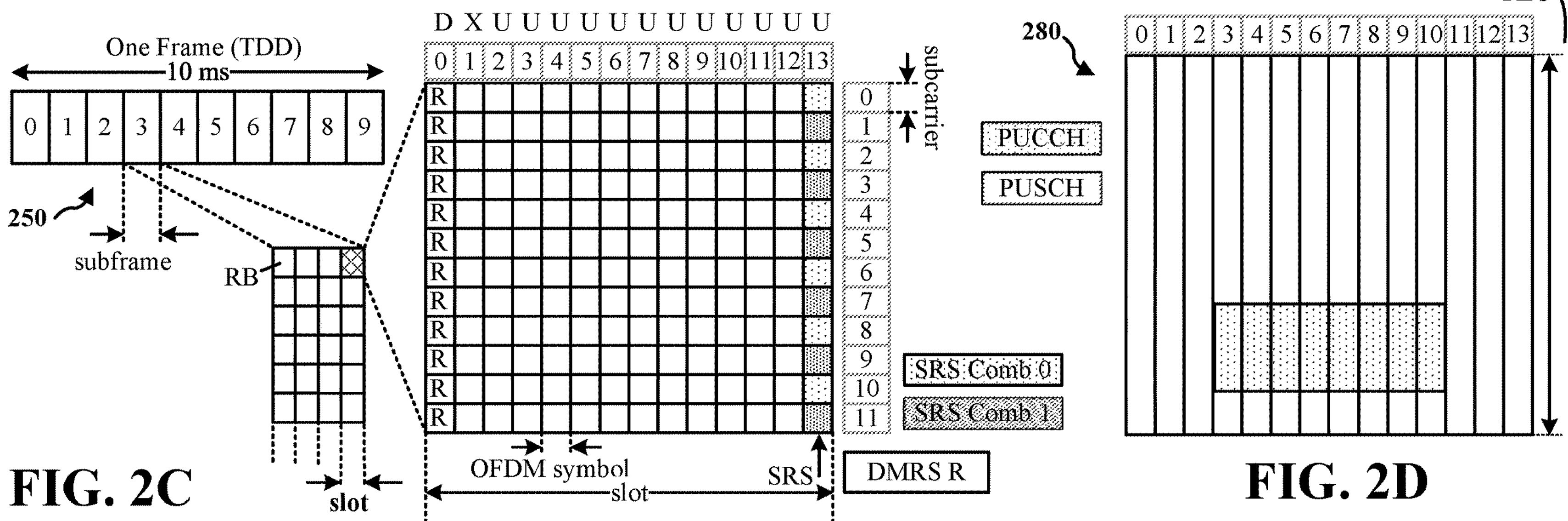
FIG. 2C
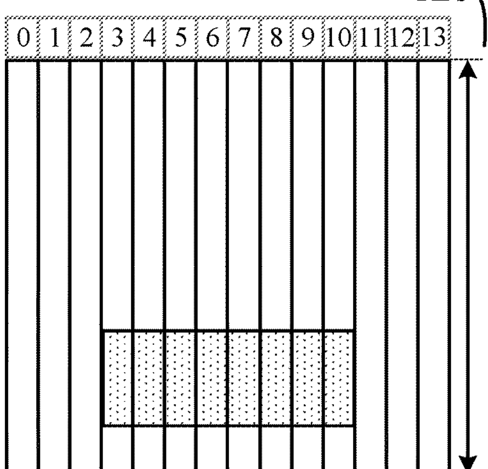
FIG. 2D

METHODS AND APPARATUS FOR DOWNLINK RECEIVE BEAM REFINEMENT

CROSS REFERENCE TO RELATED APPLICATION(S)

This application claims the benefit of U.S. Provisional Application Ser. No. 63/037,942, entitled "METHODS AND APPARATUS FOR DOWNLINK RECEIVE BEAM REFINEMENT" and filed on Jun. 11, 2020, which is expressly incorporated by reference herein in its entirety.

TECHNICAL FIELD

The present disclosure relates generally to communication systems, and more particularly, to beam selection or beam refinement in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a channel state information (CSI) report configuration via radio resource control (RRC) signaling, where the CSI report configuration may include at least one of a channel measurement resource (CMR) resource setting, an interference measurement resource (IMR) resource setting, or a report quantity parameter. The apparatus may also decode the CSI report configuration. The apparatus may also determine a downlink receive beam of one or more downlink receive beams based on the CSI report configuration. Additionally, the apparatus may select the downlink receive beam of the one or more downlink receive beams based on the CSI report configuration. The apparatus may also calculate a signal-to-interference-plus-noise ratio (SINR) quantity associated with a plurality of downlink transmit beams. Moreover, the apparatus may update a quasi co-location (QCL) type D (QCL-TypeD) parameter for one or more downlink resources, where the QCL-TypeD parameter may be associated with a transmission configuration indication (TCI) state. The apparatus may also communicate with a base station via the downlink receive beam based on the determined downlink receive beam.

In another aspect of the disclosure, a method, a computer-readable medium, and an apparatus are provided. The apparatus may be a base station. The apparatus may determine a channel state information (CSI) report configuration, where the CSI report configuration may include at least one of a channel measurement resource (CMR) resource setting, an interference measurement resource (IMR) resource setting, or a report quantity parameter. The apparatus may also encode the CSI report configuration. Further, the apparatus may transmit the CSI report configuration to a user equipment (UE) via radio resource control (RRC) signaling. The apparatus may also communicate with the UE via a downlink receive beam of one or more downlink receive beams based on the CSI report configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
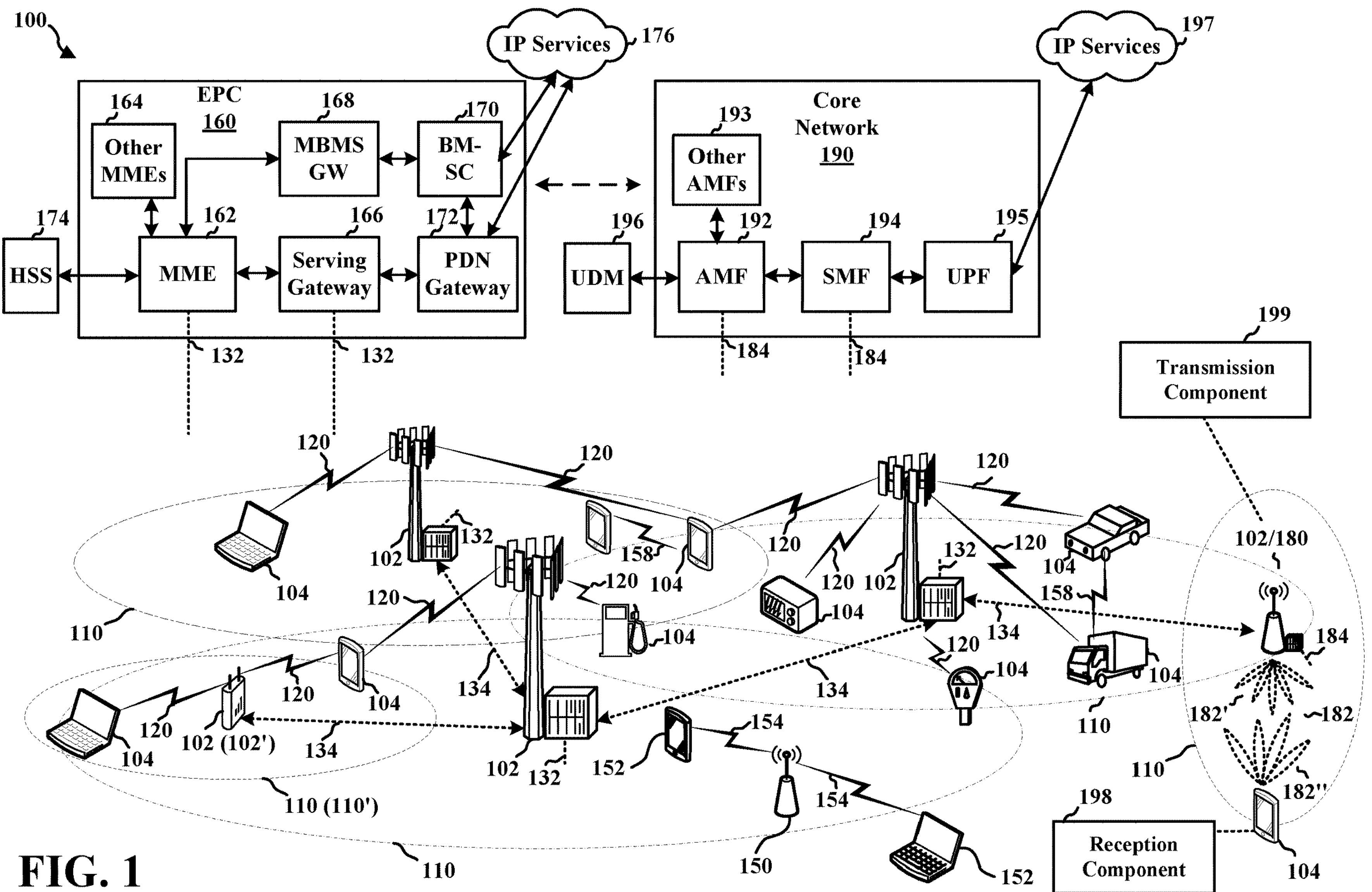
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive a channel state information (CSI) report configuration via radio resource control (RRC) signaling, where the CSI report configuration may include at least one of a channel measurement resource (CMR) resource setting, an interference measurement resource (IMR) resource setting, or a report quantity parameter. Reception component 198 may also be configured to decode the CSI report configuration. Reception component 198 may also be configured to determine a downlink receive beam of one or more downlink receive beams based on the CSI report configuration. Reception component 198 may also be configured to select the downlink receive beam of the one or more downlink receive beams based on the CSI report configuration. Reception component 198 may also be configured to calculate a signal-to-interference-plus-noise ratio (SINR) quantity associated with a plurality of downlink transmit beams. Reception component 198 may also be configured to update a quasi co-location (QCL) type D (QCL-TypeD) parameter for one or more downlink resources, where the QCL-TypeD parameter may be associated with a transmission configuration indication (TCI) state. Reception component 198 may also be configured to communicate with a base station via the downlink receive beam based on the determined downlink receive beam.

Referring again to FIG. 1, in certain aspects, the base station 180 may include a transmission component 199 configured to determine a channel state information (CSI) report configuration, where the CSI report configuration may include at least one of a channel measurement resource (CMR) resource setting, an interference measurement resource (IMR) resource setting, or a report quantity parameter. Transmission component 199 may also be configured to encode the CSI report configuration. Transmission component 199 may also be configured to transmit the CSI report configuration to a user equipment (UE) via radio resource control (RRC) signaling. Transmission component 199 may also be configured to communicate with the UE via a downlink receive beam of one or more downlink receive beams based on the CSI report configuration.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
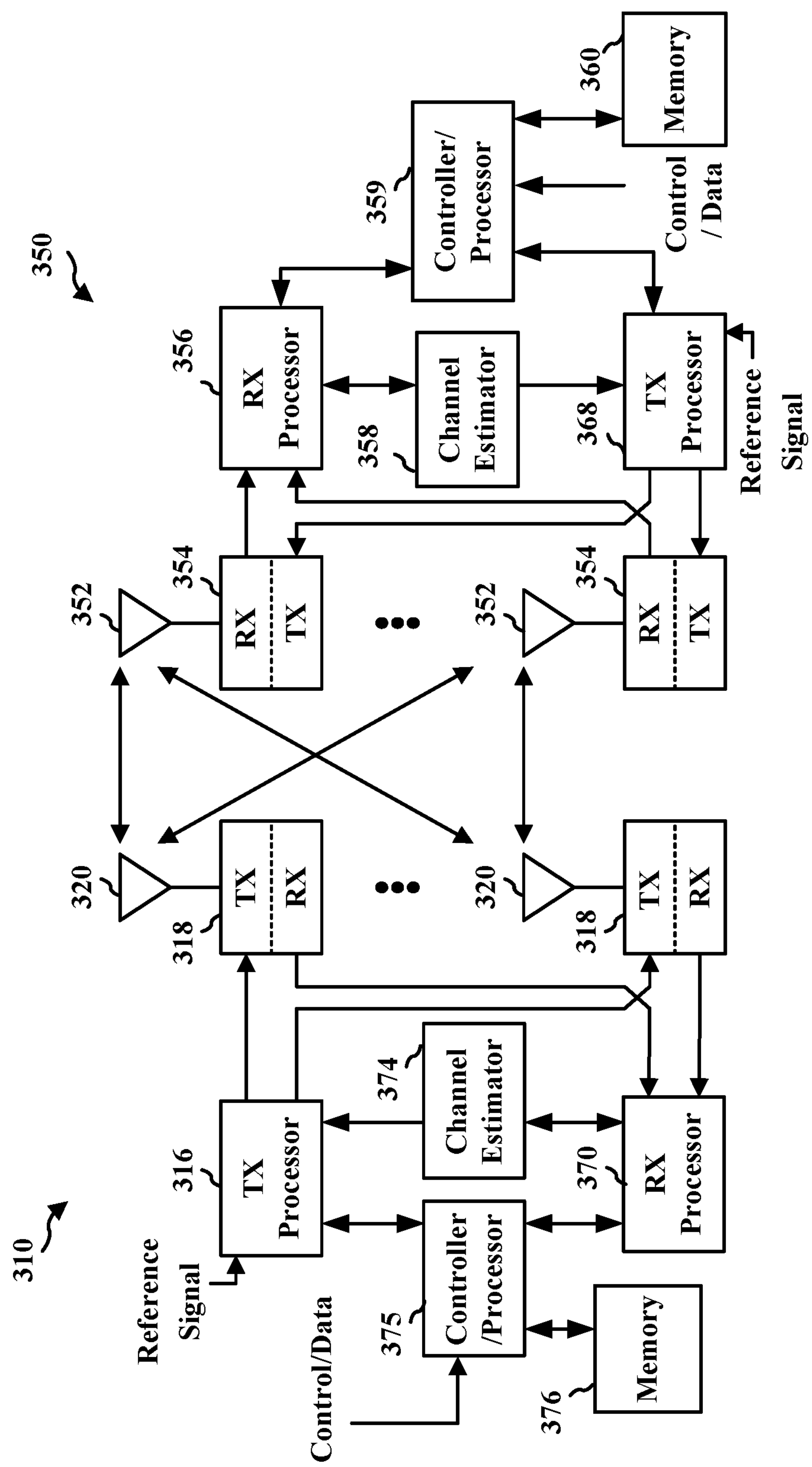
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communications, beam management procedures may be used to enable a UE to refine its downlink receive (Rx) beam, i.e., via a P3 beam sweeping. Based on this refinement, the UE may select a beam to improve the existing communication link. This selected or 'best' beam may be used to serve as the receive spatial filter, e.g., quasi co-location (QCL) type D (QCL-TypeD), associated with downlink (DL) transmissions or a TCI state. Moreover, a P3 beam may be used for an uplink spatial relation or a TCI state.

To enable downlink receive beam refinement, a downlink reference signal, e.g., a synchronization signal block (SSB) or a CSI-RS, may be transmitted repeatedly and the UE may select a suitable matching Rx beam. As such, the base station may transmit reference signals in the downlink with the repetition parameter enabled. For instance, the same set of beams may be transmitted more than once, so the UE may sweep over this set of beams and identify the most suitable beam for a particular channel or use case. In some instances, different beams may be considered more desirable for different use cases, which may be determined by the UE. The P3 beam selection may be based on the UE implementation and/or the beam that maximizes the reference signal received power (RSRP) or other layer 1 (L1) quality measurements.

Figure 4:
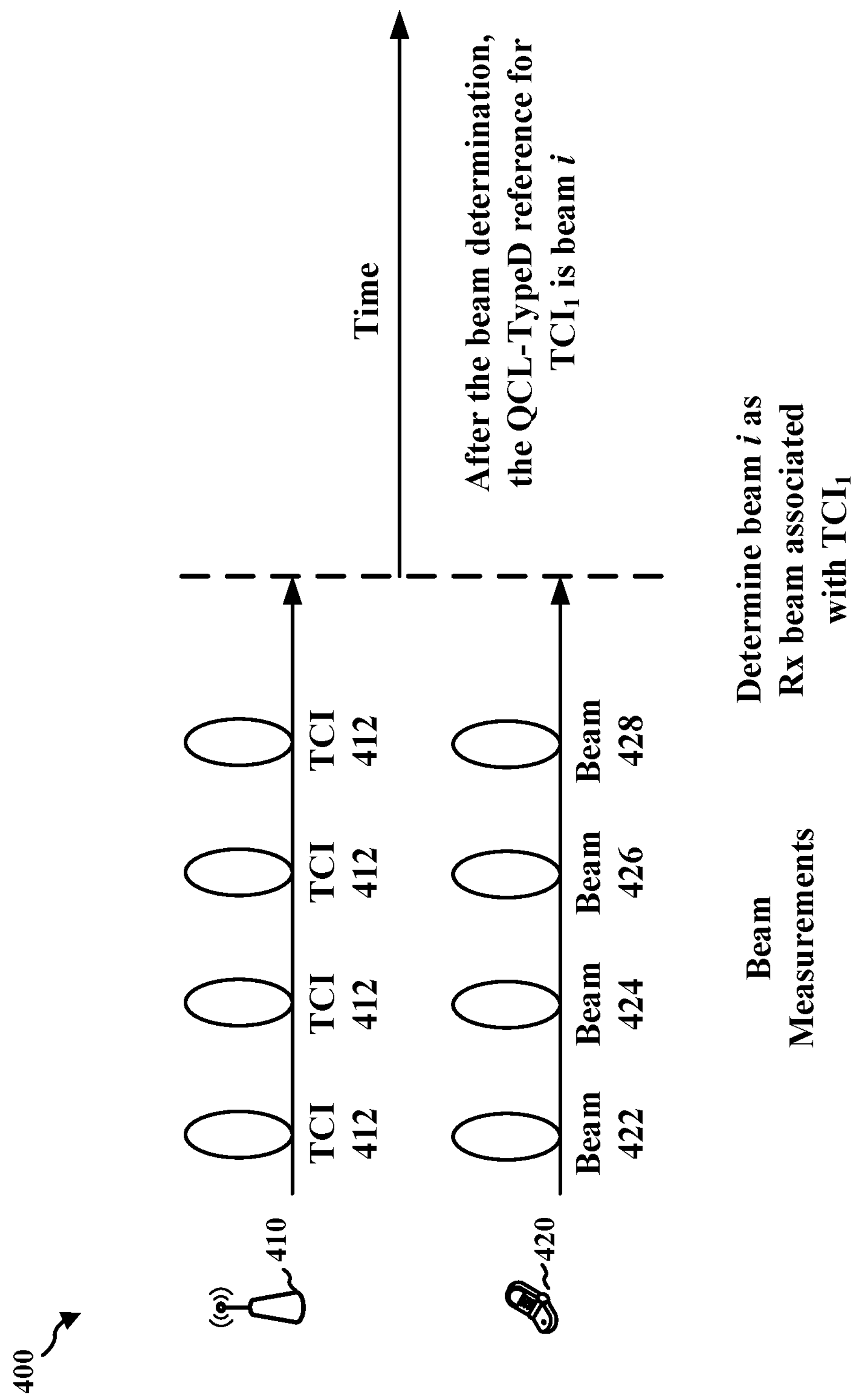
FIG. 4 is a diagram illustrating an example beam determination configuration in accordance with one or more techniques of the present disclosure.

FIG. 4 is a diagram 400 illustrating an example beam determination configuration. As shown in FIG. 4, diagram 400 includes base station 410, TCI state 412, UE 420, beam 422, beam 424, beam 426, and beam 428. FIG. 4 shows that UE 420 may receive a beam, e.g., beam 422, with an assigned TCI state or $TCI_1$, e.g., TCI 412. UE 420 may determine a suitable beam i, e.g., beam 422, as the Rx beam associated with the TCI state or $TCI_1$. After the beam determination, the QCL-TypeD reference for $TCI_1$, e.g., TCI 412, may be updated as beam i, e.g., beam 422.

As indicated above, a base station may transmit a beam with an assigned TCI state, e.g., $TCI_1$. Also, a UE may determine a suitable beam, e.g., beam i, as the Rx beam associated with the TCI state, e.g., $TCI_1$. After the beam determination, the QCL-TypeD reference for $TCI_1$ may be updated as beam i. Additionally, after this determination, any TCI state with $TCI_1$ as a QCL-TypeD source may be associated with beam i. The UE may also specify the uplink transmit (Tx) beam based on this beam determination procedure. The actual refinement may be transparent to the base station, as the UE may not report back the beam selection to the base station.

Some aspects of wireless communications may include P3 beam refinement signaling procedures. For instance, the base station may signal a report setting, e.g., via a RRC CSI report configuration information element (CSI-ReportConfig IE), including a number of different aspects. Also, a channel measurement resource (CMR), e.g., a SSB or a non-zero power (NZP) CSI-RS (NZP-CSI-RS) resource set, or an interference measurement resource (IMR) may include a repetition parameter that is enabled or set to a value of 'on'. For instance, the resources indicated within the report setting may be transmitted with the same spatial transmit filters over multiple symbols.

Also, a report quantity (reportQuantity) parameter may be disabled or set to a value of 'none', i.e., meaning the UE may not need to signal back any beam report to the base station, or it may be a L1 RSRP (L1-RSRP) based quantity or a L1 SINR (L1-SINR) based quantity, e.g., CSI-RS resource indicator (CRI) RSRP (CRI-RSRP), SSB index RSRP (SSB-Index-RSRP), CRI SINR (CRI-SINR), or SSB index SINR (SSB-Index-SINR). If the reportQuantity parameter is L1-RSRP based, the UE implementation may select an appropriate or suitable Rx beam that may guarantee a certain RSRP. If the reportQuantity parameter is L1-SINR based, it may be up to the UE implementation to select an appropriate or suitable Rx beam that may guarantee a certain SINR, while an additional interference measurement resource (IMR) resource setting, e.g., NZP-CSI-RS and/or CSI-IM resource settings, may be additionally configured by the base station in the report setting or CSI report configuration.

In some aspects, for L1-SINR measurement, when the repetition parameter is enabled, the base station may transmit the same resources over multiple symbols, and the UE may measure these resources and determine the beam. Also, the SINR may be defined as the received power on a channel measurement resource (CMR) resource setting over the received power on an IMR resource setting plus noise. In some aspects, the UE may apply a QCL-TypeD assumption of the SSB or a QCL-TypeD configured to a NZP-CSI-RS for a channel measurement to measure the associated CSI-IM resource or associated NZP-CSI-RS resource for an interference measurement configured for CSI reporting. Additionally, the UE may expect that the NZP-CSI-RS resource set for channel measurement and the NZP-CSI-RS resource set for interference measurement are configured with a higher layer repetition parameter.

In some aspects, for RRC configuration, a CSI report configuration information element may specify which resource settings may be utilized for channel measurement or interference measurement. Also, each of the resource settings may include multiple resources sets, where each of the resource sets include multiple resources. Within each resource set, the repetition parameter may be enabled or disabled. When the repetition is enabled, each resource within a resource set may utilize the same Tx beam for transmission. So the repetition parameter may allow the base station to signal whether the UE should use the same downlink beam or different downlink beams. Also, multiple beams may be configured for measurement and/or reporting.

In some aspects, although the UE behavior may be defined based on the L1-RSRP or L1-SINR, there may be no identification of the UE behavior when the reportQuantity parameter is disabled or set to a value of 'none'. In some aspects, when the reportQuantity parameter is disabled or set to a value of 'none', the UE may ignore the IMR and use CMR for P3 beam management, even if the IMR is configured as an NZP-CSI-RS with the repetition parameter enabled or set to a value of 'on'.

In some aspects, if there is another CSI-RS configuration for an interference measurement, the UE may ignore this parameter for the beam refinement process. Also, the UE may use more than two resource settings for SINR measurement, e.g., including CMR. In some instances, a downlink transmit beam may correspond to the CMR. And the UE may refine or identify a more suitable downlink receive beam. As indicated above, when the base station disables the report quantity parameter or sets it to a value of 'none', the UE may not need to report back the beam selection to the base station. As indicated above, it may be beneficial to identify or define the UE behavior for beam resources when the report quantity parameter is undefined or set to a value of 'none'. Accordingly, it may be beneficial to provide different beam refinement techniques, e.g., based on an SINR metric.

Aspects of the present disclosure may identify or define the UE behavior for beam resources when the report quantity parameter is undefined or set to a value of 'none'. In addition, aspects of the present disclosure may include a number of different beam refinement techniques, e.g., based on an SINR metric.

In some aspects, for an SINR optimal Rx beam, a number of different configurations may be considered by the UE. For instance, for a CMR resource setting, a first NZP-CSI-RS resource set may include a repetition parameter enabled or set to a value of 'on'. Also, for an IMR resource setting, a second NZP-CSI-RS resource set may include a repetition parameter enabled or set to a value of 'on'. This may be either explicitly configured or implicitly derived from a first NZP-CSI-RS resource set. Further, the report quantity parameter may also be disabled or set to a value of 'none'. In this configuration, the UE may implicitly understand the resource configuration to be utilized for SINR based P3 beam management. In some aspects, the CMR resource setting and the IMR resource setting may be one-to-one mapped based on the ordering of the resources in the resource setting. Also, if the interference measurement is performed on a CSI interference measurement (CSI-IM), each CSI-RS resource for channel measurement may be resource-wise associated with a CSI-IM resource by the ordering of the CSI-RS resource and the CSI-IM resource in the corresponding resource sets.

Aspects of the present disclosure may also include at least one signaling condition to enable SINR based P3 beam management. The signaling condition may be implicitly indicated, where the CMR resource setting and the IMR resource setting may be configured with a repetition parameter enabled or set to a value of 'on', and the reportQuantity parameter may be disabled or set to a value of 'none'. Also, the signaling condition may be explicitly indicated via a separate flag in RRC signaling, a medium access control (MAC) control element (MAC-CE), and/or downlink control information (DCI), such as to enable or disable SINR based P3 beam management. In some aspects, a single resource set may be configured, such that the same set may be used for both the CMR resource setting and the IMR resource setting. Also, multiple resource sets may be configured, e.g., one for the CMR resource setting and one for the IMR resource setting.

Aspects of the present disclosure may also include a number of configurations of resource sets. For instance, aspects of the present disclosure may include an explicit two set case with a repetition parameter enabled or set to a value of 'on' for each resource set. The CMR resource setting may be a SSB or a NZP-CSI-RS resource set with the repetition parameter enabled or set to a value of 'on'. Also, the IMR resource setting may be a CSI-IM resource set or a NZP-CSI-RS resource set with a repetition parameter enabled or set to a value of 'on'. The UE may be expected to apply the same QCL-TypeD assumption for receiving the CMR set and the associated IMR set. This may also be used to compute the SINR for the beam configuration.

Aspects of the present disclosure may also include an implicit setting. For instance, when the repetition parameter is enabled or set to a value of 'on', the UE may expect the base station to use the same spatial domain Tx parameter for all the resources with the resource set, i.e., the same Tx beam is repeated across symbols to enable the UE to perform the P3 beam sweep. This implicit setting may be utilized for a channel measurement and an interference measurement.

In the context of SINR based P3 beam refinement, aspects of the present disclosure may utilize a different interpretation and/or signaling. Each resource setting may include one or more resource sets, where each resource set, e.g., with a repetition parameter enabled or set to a value of 'on', is supported with a periodic resource type, an aperiodic resource type, or a semi-persistent resource type. Also, a mapping (i,j)→(f(i),g(j)), e.g., from resource i of set j to resource f(i) of set g(j), may be injective and may be either explicitly signaled or implicitly derived, e.g., g(j)=mod(j+k, N), where N is the number of resource sets in the resource setting and k is a fixed or dynamically adjustable signaling parameter. Also, the mapping may be from a first set to a derived set based on the first set. The first set may be a CMR set and the derived set based on the first set may be an IMR set.

In some aspects, a resource set with the repetition enabled or set to a value of 'on' may have multiple subgroups with different QCL-TypeD TCI states. Within each subgroup having the same TCI state, e.g., a QCL-TypeD source, the same Tx beam may be used. The subgroups may be explicitly configured or signaled and/or may be implicitly understood based on resource ID ordering or the QCL source. For example, a resource set with a repetition parameter enabled or 'on' may have four (4) CSI-RS resources over four (4) symbols, and the first two CSI-RS resources may have the same TCI state, and the other two CSI-RS resources may have another TCI state. This may be interpreted as a pair-wise repetition within a set.

Aspects of the present disclosure may also include an explicit case or a two resource set. Two resource sets may be configured with the repetition parameter enabled or set to a value of 'on'. For example, one resource set may be CMR resource setting and the other resource set may be IMR resource setting. These resources may be one-to-one mapped by the ordering of the resource ID. Also, each resource set or group may have multiple subsets or subgroups. Additionally, aspects of the present disclosure may include an implicit case or a single resource set. The same resource set with subgroups may be used as both the CMR resource setting and the IMR resource setting. So the mapping may be between subgroups, where each group may include multiple subgroups. Also, each of the resources may correspond to a subgroup.

Aspects of the present disclosure may also include certain types of UE behavior. Over the NZP-CSI-RS resources in the CMR, the UE may sweep a set of Rx beams to measure the reference signal received power (RSRP). Further, over the NZP-CSI-RS resource in the IMR, the UE may sweep the same set of Rx beams to measure interference. This may occur in a separate time occasion from the CMR measurement. Also, the same beam that is used to measure the CMR may be used to measure the IMR. From the beam sweeping results for CMR and IMR, the UE may calculate the SINR in a downlink Tx beam pair, and then select the Rx beam that optimizes or maximizes the SINR. In some instances, the most suitable Rx beam or P3 beam may be specific to the report configuration. Additionally, depending on the one-to-one mapping configuration between the CMR and the IMR, the P3 beam may be a different beam.

Aspects of the present disclosure may also include group-based beam reporting. In the report setting, if a group-based beam reporting (groupBasedBeamReporting) parameter is enabled, the UE may be expected to report two different RSRP or SINR-based report quantities in a single setting. Also, the two CRIs reported back in the single report setting may correspond to a CSI-RS and/or SSB resource that may be simultaneously received by the UE. In this context, the P3 beam procedure may be based on a number of procedures. For instance, if multiple Tx beams, e.g., a first beam for the first NZP-CSI-RS resource set and a second beam for the second NZP-CSI-RS resource set, are beams for group-based beam reporting, i.e., simultaneously transmittable, the UE may swap the role of CMR and IMR within a burst of repetition of over different bursts and/or refine the two Rx beams.

Figure 5:
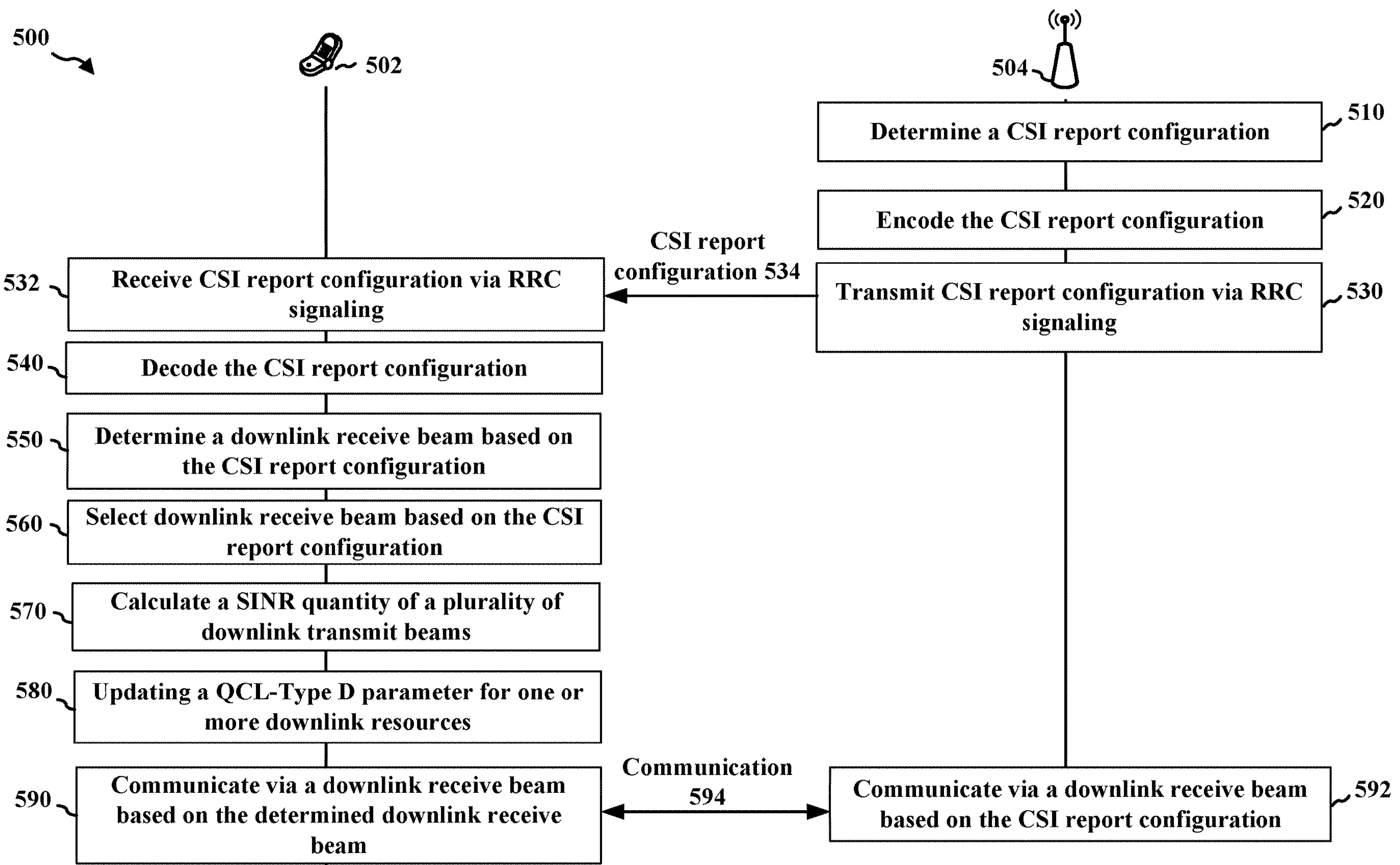
FIG. 5 is a diagram illustrating example communication between a UE and a base station in accordance with one or more techniques of the present disclosure.

FIG. 5 is a diagram 500 illustrating example communication between a UE 502 and a base station 504. At 510, base station 504 may determine a channel state information (CSI) report configuration, where the CSI report configuration may include at least one of a channel measurement resource (CMR) resource setting, an interference measurement resource (IMR) resource setting, or a report quantity parameter.

At 520, base station 504 may encode the CSI report configuration, e.g., CSI report configuration 534.

At 530, base station 504 may transmit the CSI report configuration, e.g., CSI report configuration 534, to UE 502 via radio resource control (RRC) signaling.

At 532, UE 502 may receive a CSI report configuration, e.g., CSI report configuration 534, via RRC signaling, where the CSI report configuration may include at least one of a CMR resource setting, an IMR resource setting, or a report quantity parameter.

At 540, UE 502 may decode the CSI report configuration, e.g., CSI report configuration 534.

At 550, UE 502 may determine a downlink receive beam of one or more downlink receive beams based on the CSI report configuration. This may be the UE beam used for receiving downlink transmission associated with a TCI state among one or more UE beams. In some aspects, the UE may determine its Rx spatial filter parameters for receiving a downlink transmission. In some instances, the downlink receive beam may be determined based on at least one signaling condition. The at least one signaling condition may be implicitly indicated based on at least one of the CMR resource setting with a repetition parameter that is enabled, the IMR resource setting with a repetition parameter that is enabled, or the report quantity parameter. Also, the at least one signaling condition may be explicitly indicated via at least one of RRC signaling, a medium access control (MAC) control element (MAC-CE), or downlink control information (DCI).

At 560, UE 502 may select the downlink receive beam of the one or more downlink receive beams based on the CSI report configuration. In some instances, the report quantity parameter may be disabled or set to a value of 'none'. Also, the CMR resource setting may include at least one non-zero power CSI reference signal (NZP-CSI-RS) resource set with a repetition parameter that is enabled or a synchronization signal block (SSB). The at least one NZP-CSI-RS resource set may also include at least one NZP-CSI-RS resource. Further, the IMR resource setting may include at least one NZP-CSI-RS resource set with a repetition parameter that is enabled or a CSI interference measurement (CSI-IM) resource set.

In some aspects, the CMR resource setting may include one or more CMR resources and the IMR resource setting may include one or more IMR resources. The one or more CMR resources may include one or more CMR subgroups, where each of the one or more CMR subgroups may be associated with a TCI state. Also, the one or more IMR resources may include one or more IMR subgroups, where each of the one or more IMR subgroups may be associated with a TCI state. Further, at least one of the one or more CMR resources or the one or more IMR resources may be indicated via one or more CSI-RS resource indicators (CRIs).

At 570, UE 502 may calculate a signal-to-interference-plus-noise ratio (SINR) quantity associated with a plurality of downlink transmit beams. In some aspects, the downlink receive beam may be determined based on the SINR quantity associated with the plurality of downlink transmit beams. Also, the CMR resource setting may be associated with a first downlink transmit beam of the plurality of downlink transmit beams, and the IMR resource setting may be associated with a second downlink transmit beam of the plurality of downlink transmit beams. The SINR quantity associated with the plurality of downlink transmit beams may also be determined based on a resource mapping of one or more CMR resources and one or more IMR resources.

At 580, UE 502 may update a quasi co-location (QCL) type D (QCL-TypeD) parameter for one or more downlink resources, where the QCL-TypeD parameter may be associated with a transmission configuration indication (TCI) state.

At 590, UE 502 may communicate with base station 504, e.g., communication 594, via the downlink receive beam based on the determined downlink receive beam.

At 592, base station 504 may communicate with UE 502, e.g., communication 594, via a downlink receive beam of one or more downlink receive beams based on the CSI report configuration.

Figure 6:
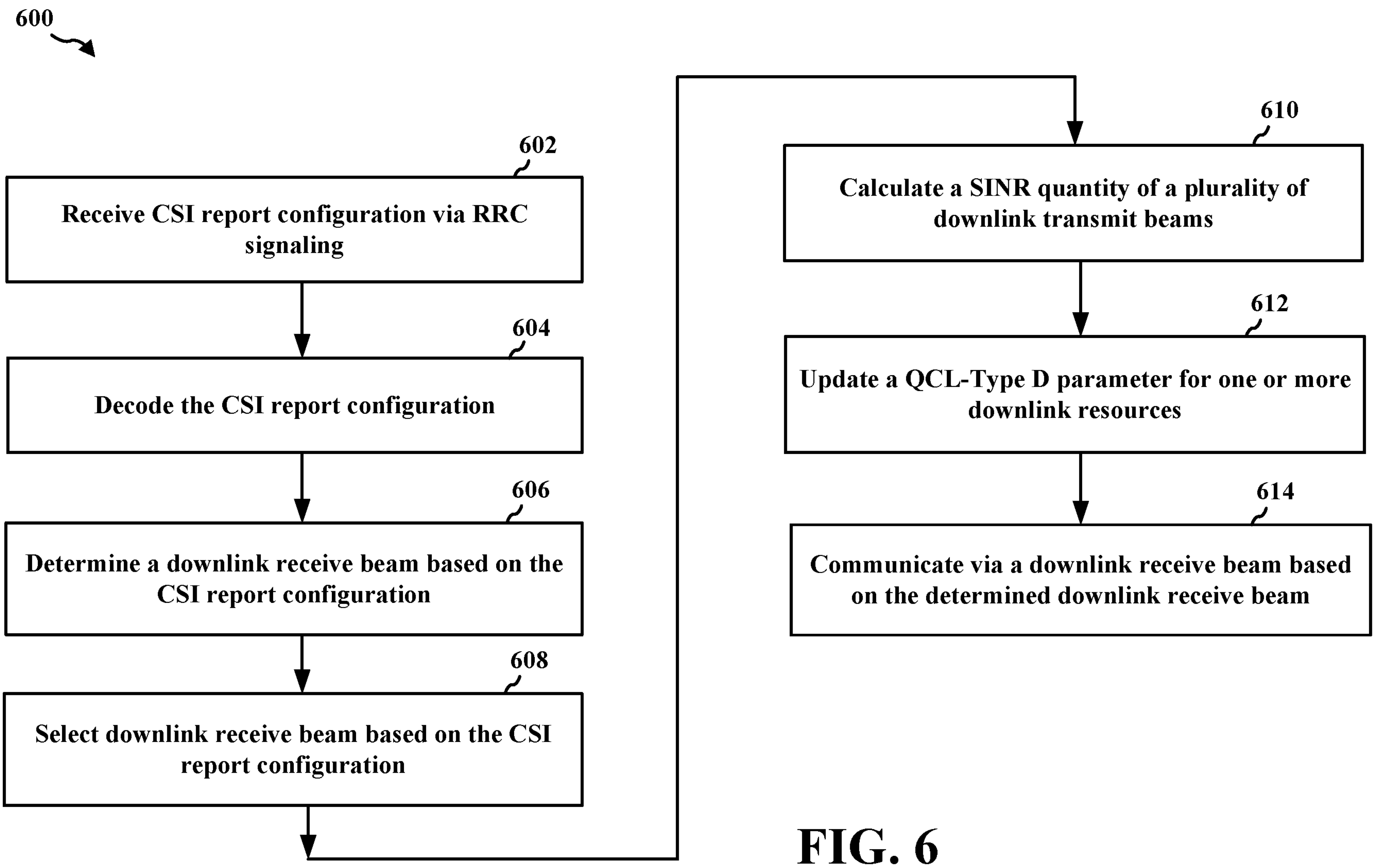
FIG. 6 is a flowchart of a method of wireless communication.

FIG. 6 is a flowchart 600 of a method of wireless communication. The method may be performed by a UE or a component of a UE (e.g., the UE 104, 350, 502; apparatus 802; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 602, the apparatus may receive a channel state information (CSI) report configuration via radio resource control (RRC) signaling, where the CSI report configuration may include at least one of a channel measurement resource (CMR) resource setting, an interference measurement resource (IMR) resource setting, or a report quantity parameter, as described in connection with the examples in FIGS. 4 and 5. For example, UE 502 may receive a channel state information (CSI) report configuration via radio resource control (RRC) signaling, where the CSI report configuration may include at least one of a channel measurement resource (CMR) resource setting, an interference measurement resource (IMR) resource setting, or a report quantity parameter, as described in connection with 532 in FIG. 5. Further, 602 may be performed by determination component 840 in FIG. 8.

At 604, the apparatus may decode the CSI report configuration, as described in connection with the examples in FIGS. 4 and 5. For example, UE 502 may decode the CSI report configuration, as described in connection with 540 in FIG. 5. Further, 604 may be performed by determination component 840 in FIG. 8.

At 606, the apparatus may determine a downlink receive beam of one or more downlink receive beams based on the CSI report configuration, as described in connection with the examples in FIGS. 4 and 5. For example, UE 502 may determine a downlink receive beam of one or more downlink receive beams based on the CSI report configuration, as described in connection with 550 in FIG. 5. Further, 606 may be performed by determination component 840 in FIG. 8. In some instances, the downlink receive beam may be determined based on at least one signaling condition, as described in connection with the examples in FIGS. 4 and 5. The at least one signaling condition may be implicitly indicated based on at least one of the CMR resource setting with a repetition parameter that is enabled, the IMR resource setting with a repetition parameter that is enabled, or the report quantity parameter, as described in connection with the examples in FIGS. 4 and 5. Also, the at least one signaling condition may be explicitly indicated via at least one of RRC signaling, a medium access control (MAC) control element (MAC-CE), or downlink control information (DCI), as described in connection with the examples in FIGS. 4 and 5.

At 608, the apparatus may select the downlink receive beam of the one or more downlink receive beams based on the CSI report configuration, as described in connection with the examples in FIGS. 4 and 5. For example, UE 502 may select the downlink receive beam of the one or more downlink receive beams based on the CSI report configuration, as described in connection with 560 in FIG. 5. Further, 608 may be performed by determination component 840 in FIG. 8. In some instances, the report quantity parameter may be disabled or set to a value of 'none', as described in connection with the examples in FIGS. 4 and 5. Also, the CMR resource setting may include at least one non-zero power CSI reference signal (NZP-CSI-RS) resource set with a repetition parameter that is enabled or a synchronization signal block (SSB), as described in connection with the examples in FIGS. 4 and 5. The at least one NZP-CSI-RS resource set may also include at least one NZP-CSI-RS resource, as described in connection with the examples in FIGS. 4 and 5. Further, the IMR resource setting may include at least one NZP-CSI-RS resource set with a repetition parameter that is enabled or a CSI interference measurement (CSI-IM) resource set, as described in connection with the examples in FIGS. 4 and 5.

In some aspects, the CMR resource setting may include one or more CMR resources and the IMR resource setting may include one or more IMR resources, as described in connection with the examples in FIGS. 4 and 5. The one or more CMR resources may include one or more CMR subgroups, where each of the one or more CMR subgroups may be associated with a TCI state, as described in connection with the examples in FIGS. 4 and 5. Also, the one or more IMR resources may include one or more IMR subgroups, where each of the one or more IMR subgroups may be associated with a TCI state, as described in connection with the examples in FIGS. 4 and 5. Further, at least one of the one or more CMR resources or the one or more IMR resources may be indicated via one or more CSI-RS resource indicators (CRIs), as described in connection with the examples in FIGS. 4 and 5.

At 610, the apparatus may calculate a signal-to-interference-plus-noise ratio (SINR) quantity associated with a plurality of downlink transmit beams, as described in connection with the examples in FIGS. 4 and 5. For example, UE 502 may calculate a signal-to-interference-plus-noise ratio (SINR) quantity of associated with a plurality of downlink transmit beams, as described in connection with 570 in FIG. 5. Further, 610 may be performed by determination component 840 in FIG. 8. In some aspects, the downlink receive beam may be determined based on the SINR quantity associated with the plurality of downlink transmit beams, as described in connection with the examples in FIGS. 4 and 5. Also, the CMR resource setting may be associated with a first downlink transmit beam of the plurality of downlink transmit beams, and the IMR resource setting may be associated with a second downlink transmit beam of the plurality of downlink transmit beams, as described in connection with the examples in FIGS. 4 and 5. The SINR quantity of associated with the plurality of downlink transmit beams may also be determined based on a resource mapping of one or more CMR resources and one or more IMR resources, as described in connection with the examples in FIGS. 4 and 5.

At 612, the apparatus may update a quasi co-location (QCL) type D (QCL-TypeD) parameter for one or more downlink resources, where the QCL-TypeD parameter may be associated with a transmission configuration indication (TCI) state, as described in connection with the examples in FIGS. 4 and 5. For example, UE 502 may update a quasi co-location (QCL) type D (QCL-TypeD) parameter for one or more downlink resources, where the QCL-TypeD parameter may be associated with a transmission configuration indication (TCI) state, as described in connection with 580 in FIG. 5. Further, 612 may be performed by determination component 840 in FIG. 8.

At 614, the apparatus may communicate with a base station via the downlink receive beam based on the determined downlink receive beam, as described in connection with the examples in FIGS. 4 and 5. For example, UE 502 may communicate with a base station via the downlink receive beam based on the determined downlink receive beam, as described in connection with 590 in FIG. 5. Further, 614 may be performed by determination component 840 in FIG. 8.

Figure 7:
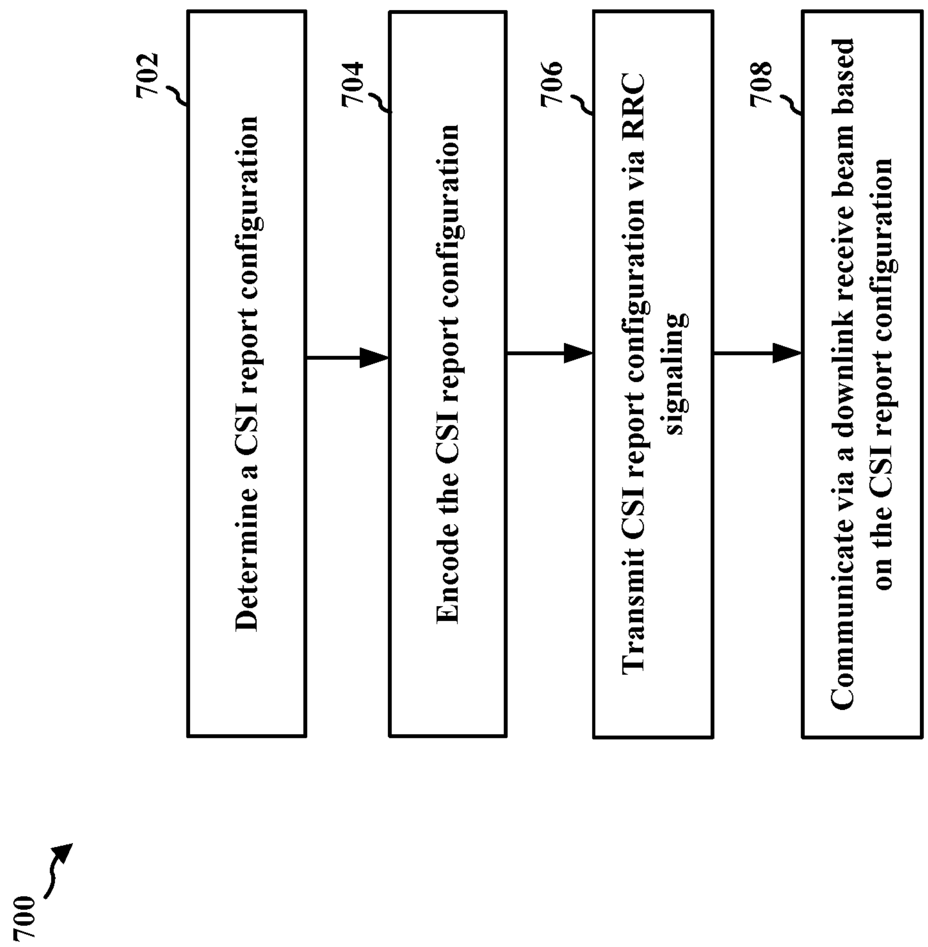
FIG. 7 is a flowchart of a method of wireless communication.

FIG. 7 is a flowchart 700 of a method of wireless communication. The method may be performed by a base station or a component of a base station (e.g., the base station 102, 180, 310, 504; apparatus 902; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 702, the apparatus may determine a channel state information (CSI) report configuration, where the CSI report configuration may include at least one of a channel measurement resource (CMR) resource setting, an interference measurement resource (IMR) resource setting, or a report quantity parameter, as described in connection with the examples in FIGS. 4 and 5. For example, base station 504 may determine a channel state information (CSI) report configuration, where the CSI report configuration may include at least one of a channel measurement resource (CMR) resource setting, an interference measurement resource (IMR) resource setting, or a report quantity parameter, as described in connection with 510 in FIG. 5. Further, 702 may be performed by determination component 940 in FIG. 9.

At 704, the apparatus may encode the CSI report configuration, as described in connection with the examples in FIGS. 4 and 5. For example, base station 504 may encode the CSI report configuration, as described in connection with 520 in FIG. 5. Further, 704 may be performed by determination component 940 in FIG. 9.

At 706, the apparatus may transmit the CSI report configuration to a user equipment (UE) via radio resource control (RRC) signaling, as described in connection with the examples in FIGS. 4 and 5. For example, base station 504 may transmit the CSI report configuration to a user equipment (UE) via radio resource control (RRC) signaling, as described in connection with 530 in FIG. 5. Further, 706 may be performed by determination component 940 in FIG. 9. In some instances, the report quantity parameter may be disabled or set to a value of 'none', as described in connection with the examples in FIGS. 4 and 5. Also, the CMR resource setting may include at least one non-zero power CSI reference signal (NZP-CSI-RS) resource set with a repetition parameter that is enabled or a synchronization signal block (SSB), as described in connection with the examples in FIGS. 4 and 5. The at least one NZP-CSI-RS resource set may also include at least one NZP-CSI-RS resource, as described in connection with the examples in FIGS. 4 and 5. Further, the IMR resource setting may include at least one NZP-CSI-RS resource set with a repetition parameter that is enabled or a CSI interference measurement (CSI-IM) resource set, as described in connection with the examples in FIGS. 4 and 5.

In some aspects, the CMR resource setting may include one or more CMR resources and the IMR resource setting may include one or more IMR resources, as described in connection with the examples in FIGS. 4 and 5. The one or more CMR resources may include one or more CMR subgroups, where each of the one or more CMR subgroups may be associated with a TCI state, as described in connection with the examples in FIGS. 4 and 5. Also, the one or more IMR resources may include one or more IMR subgroups, where each of the one or more IMR subgroups may be associated with a TCI state, as described in connection with the examples in FIGS. 4 and 5. Further, at least one of the one or more CMR resources or the one or more IMR resources may be indicated via one or more CSI-RS resource indicators (CRIs), as described in connection with the examples in FIGS. 4 and 5.

At 708, the apparatus may communicate with the UE via a downlink receive beam of one or more downlink receive beams based on the CSI report configuration, as described in connection with the examples in FIGS. 4 and 5. For example, base station 504 may communicate with the UE via a downlink receive beam of one or more downlink receive beams based on the CSI report configuration, as described in connection with 592 in FIG. 5. Further, 708 may be performed by determination component 940 in FIG. 9. In some aspects, the downlink receive beam may be based on a signal-to-interference-plus-noise ratio (SINR) quantity associated with a plurality of downlink transmit beams, as described in connection with the examples in FIGS. 4 and 5. Also, the CMR resource setting may be associated with a first downlink transmit beam of the plurality of downlink transmit beams, and the IMR resource setting may be associated with a second downlink transmit beam of the plurality of downlink transmit beams, as described in connection with the examples in FIGS. 4 and 5. Further, the SINR quantity associated with the plurality of downlink transmit beams may be based on a resource mapping of one or more CMR resources and one or more IMR resources, as described in connection with the examples in FIGS. 4 and 5.

In some aspects, the downlink receive beam may be based on at least one signaling condition, as described in connection with the examples in FIGS. 4 and 5. Also, the at least one signaling condition may be implicitly indicated based on at least one of the CMR resource setting with a repetition parameter that is enabled, the IMR resource setting with a repetition parameter that is enabled, or the report quantity parameter, as described in connection with the examples in FIGS. 4 and 5. The at least one signaling condition may be explicitly indicated via at least one of RRC signaling, a medium access control (MAC) control element (MAC-CE), or downlink control information (DCI), as described in connection with the examples in FIGS. 4 and 5. Moreover, a quasi co-location (QCL) type D (QCL-Type D) parameter for one or more downlink resources may be associated with a transmission configuration indication (TCI) state, as described in connection with the examples in FIGS. 4 and 5.

Figure 8:
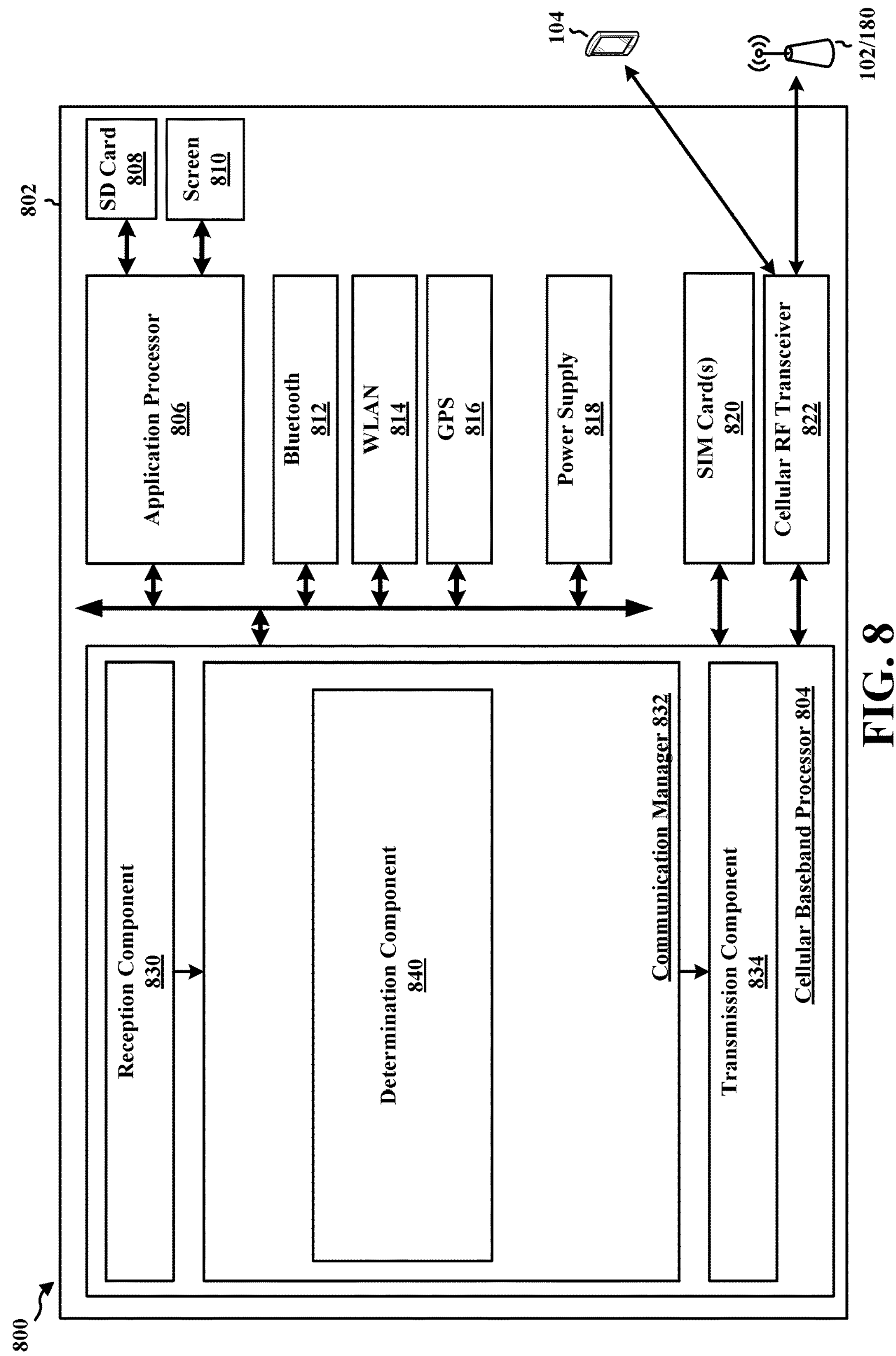
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a determination component 840 that is configured to receive a channel state information (CSI) report configuration via radio resource control (RRC) signaling, the CSI report configuration including at least one of a channel measurement resource (CMR) resource setting, an interference measurement resource (IMR) resource setting, or a report quantity parameter, e.g., as described in connection with step 602 in FIG. 6. Determination component 840 may be further configured to decode the CSI report configuration, e.g., as described in connection with step 604 in FIG. 6. Determination component 840 may be further configured to determine a downlink receive beam of one or more downlink receive beams based on the CSI report configuration, e.g., as described in connection with step 606 in FIG. 6. Determination component 840 may be further configured to select the downlink receive beam of the one or more downlink receive beams based on the CSI report configuration, e.g., as described in connection with step 608 in FIG. 6. Determination component 840 may be further configured to calculate a signal-to-interference-plus-noise ratio (SINR) quantity associated with a plurality of downlink transmit beams, e.g., as described in connection with step 610 in FIG. 6. Determination component 840 may be further configured to update a quasi co-location (QCL) type D (QCL-TypeD) parameter for one or more downlink resources, where the QCL-TypeD parameter is associated with a transmission configuration indication (TCI) state, e.g., as described in connection with step 612 in FIG. 6. Determination component 840 may be further configured to communicate with a base station via the downlink receive beam based on the determined downlink receive beam, e.g., as described in connection with step 614 in FIG. 6.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving a channel state information (CSI) report configuration via radio resource control (RRC) signaling, the CSI report configuration including at least one of a channel measurement resource (CMR) resource setting, an interference measurement resource (IMR) resource setting, or a report quantity parameter; means for decoding the CSI report configuration; means for determining a downlink receive beam of one or more downlink receive beams based on the CSI report configuration; means for selecting the downlink receive beam of the one or more downlink receive beams based on the CSI report configuration; means for calculating a signal-to-interference-plus-noise ratio (SINR) quantity associated with a plurality of downlink transmit beams; means for updating a quasi co-location (QCL) type D (QCL-TypeD) parameter for one or more downlink resources, where the QCL-TypeD parameter is associated with a transmission configuration indication (TCI) state; and means for communicating with a base station via the downlink receive beam based on the determined downlink receive beam. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
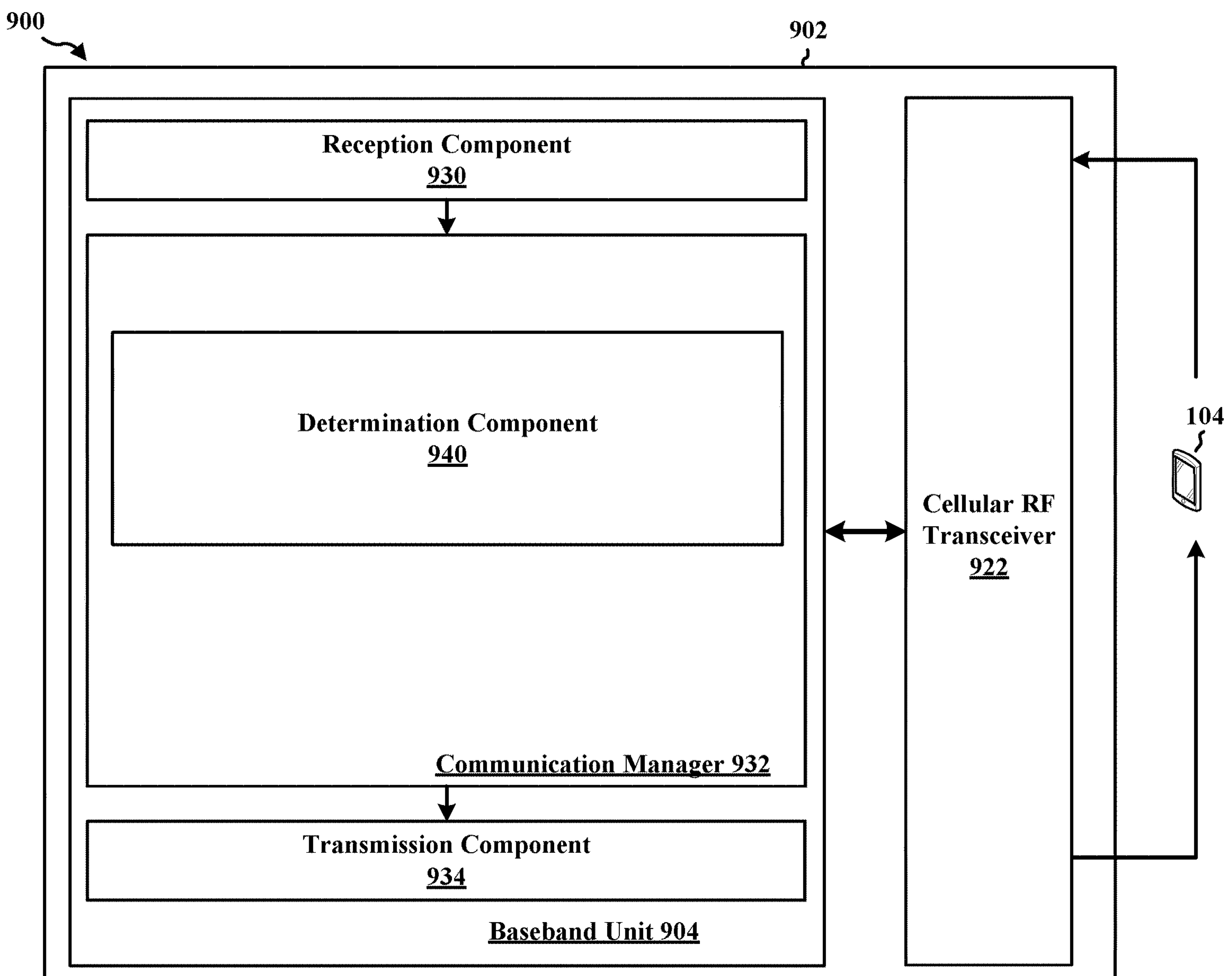
FIG. 9 is a diagram illustrating an example of a hardware implementation for an example apparatus.

FIG. 9 is a diagram 900 illustrating an example of a hardware implementation for an apparatus 902. The apparatus 902 is a base station (BS) and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a determination component 940 that is configured to determine a channel state information (CSI) report configuration, the CSI report configuration including at least one of a channel measurement resource (CMR) resource setting, an interference measurement resource (IMR) resource setting, or a report quantity parameter, e.g., as described in connection with step 702 in FIG. 7. Determination component 940 may be further configured to encode the CSI report configuration, e.g., as described in connection with step 704 in FIG. 7. Determination component 940 may be further configured to transmit the CSI report configuration to a user equipment (UE) via radio resource control (RRC) signaling, e.g., as described in connection with step 706 in FIG. 7. Determination component 940 may be further configured to communicate with the UE via a downlink receive beam of one or more downlink receive beams based on the CSI report configuration, e.g., as described in connection with step 708 in FIG. 7.

The apparatus may include additional components that perform each of the blocks of the algorithm in the aforementioned flowcharts of FIGS. 5 and 7. As such, each block in the aforementioned flowcharts of FIGS. 5 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for determining a channel state information (CSI) report configuration, the CSI report configuration including at least one of a channel measurement resource (CMR) resource setting, an interference measurement resource (IMR) resource setting, or a report quantity parameter; means for encoding the CSI report configuration; means for transmitting the CSI report configuration to a user equipment (UE) via radio resource control (RRC) signaling; and means for communicating with the UE via a downlink receive beam of one or more downlink receive beams based on the CSI report configuration. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspects 1 is a method of wireless communication at a user equipment (UE), including: receiving a channel state information (CSI) report configuration via radio resource control (RRC) signaling, the CSI report configuration including at least one of a channel measurement resource (CMR) resource setting, an interference measurement resource (IMR) resource setting, or a report quantity parameter; determining a downlink receive beam of one or more downlink receive beams based on the CSI report configuration; and communicating with a base station via the downlink receive beam based on the determined downlink receive beam.

Aspect 2 is the method of aspect 1, further including calculating a signal-to-interference-plus-noise ratio (SINR) quantity associated with a plurality of downlink transmit beams.

Aspect 3 is the method of any of aspects 1 and 2, where the downlink receive beam is determined based on the SINR quantity associated with the plurality of downlink transmit beams.

Aspect 4 is the method of any of aspects 1 and 3, where the CMR resource setting is associated with a first downlink transmit beam of the plurality of downlink transmit beams, and the IMR resource setting is associated with a second downlink transmit beam of the plurality of downlink transmit beams.

Aspect 5 is the method of any of aspects 1 and 4, where the SINR quantity associated with the plurality of downlink transmit beams is determined based on a resource mapping of one or more CMR resources and one or more IMR resources.

Aspect 6 is the method of any of aspects 1 and 5, where the downlink receive beam is determined based on at least one signaling condition.

Aspect 7 is the method of any of aspects 1 and 6, where the at least one signaling condition is implicitly indicated based on at least one of the CMR resource setting with a repetition parameter that is enabled, the IMR resource setting with a repetition parameter that is enabled, or the report quantity parameter.

Aspect 8 is the method of any of aspects 1 and 7, where the at least one signaling condition is explicitly indicated via at least one of RRC signaling, a medium access control (MAC) control element (MAC-CE), or downlink control information (DCI).

Aspect 9 is the method of any of aspects 1 and 8, where the report quantity parameter is disabled or set to a value of 'none'.

Aspect 10 is the method of any of aspects 1 and 9, where the CMR resource setting includes one or more of at least one non-zero power CSI reference signal (NZP-CSI-RS) resource set with a repetition parameter that is enabled or a synchronization signal block (SSB), where the at least one NZP-CSI-RS resource set includes at least one NZP-CSI-RS resource.

Aspect 11 is the method of any of aspects 1 and 10, where the IMR resource setting includes at least one NZP-CSI-RS resource set with a repetition parameter that is enabled or a CSI interference measurement (CSI-IM) resource set.

Aspect 12 is the method of any of aspects 1 and 11, where the CMR resource setting includes one or more CMR resources and the IMR resource setting includes one or more IMR resources.

Aspect 13 is the method of any of aspects 1 and 12, where the one or more CMR resources include one or more CMR subgroups, where each of the one or more CMR subgroups is associated with a TCI state; where the one or more IMR resources include one or more IMR subgroups, where each of the one or more IMR subgroups is associated with a TCI state.

Aspect 14 is the method of any of aspects 1 and 13, where at least one of the one or more CMR resources or the one or more IMR resources are indicated via one or more CSI-RS resource indicators (CRIs).

Aspect 15 is an apparatus for wireless communication including at least one processor coupled to a memory and configured to implement a method as in any of aspects 1 to 14.

Aspects 16 is the apparatus of aspect 15 further including a transceiver coupled to the at least one processor.

Aspect 17 is an apparatus for wireless communication including means for implementing a method as in any of aspects 1 to 14.

Aspect 18 is a computer-readable medium storing computer executable code, where the code when executed by a processor causes the processor to implement a method as in any of aspects 1 to 14.

Aspects 19 is a method of wireless communication at a base station, including: determining a channel state information (CSI) report configuration, the CSI report configuration including at least one of a channel measurement resource (CMR) resource setting, an interference measurement resource (IMR) resource setting, or a report quantity parameter; transmitting the CSI report configuration to a user equipment (UE) via radio resource control (RRC) signaling; and communicating with the UE via a downlink receive beam of one or more downlink receive beams based on the CSI report configuration.

Aspect 20 is the method of aspect 19, where the downlink receive beam is based on a signal-to-interference-plus-noise ratio (SINR) quantity associated with a plurality of downlink transmit beams.

Aspect 21 is the method of any of aspects 19 and 20, where the CMR resource setting is associated with a first downlink transmit beam of the plurality of downlink transmit beams, and the IMR resource setting is associated with a second downlink transmit beam of the plurality of downlink transmit beams.

Aspect 22 is the method of any of aspects 19 and 21, where the SINR quantity associated with the plurality of downlink transmit beams is based on a resource mapping of one or more CMR resources and one or more IMR resources.

Aspect 23 is the method of any of aspects 19 and 22, where the downlink receive beam is based on at least one signaling condition.

Aspect 24 is the method of any of aspects 19 and 23, where the at least one signaling condition is implicitly indicated based on at least one of the CMR resource setting with a repetition parameter that is enabled, the IMR resource setting with a repetition parameter that is enabled, or the report quantity parameter.

Aspect 25 is the method of any of aspects 19 and 24, where the at least one signaling condition is explicitly indicated via at least one of RRC signaling, a medium access control (MAC) control element (MAC-CE), or downlink control information (DCI).

Aspect 26 is the method of any of aspects 19 and 25, where a quasi co-location (QCL) type D (QCL-TypeD) parameter for one or more downlink resources is associated with a transmission configuration indication (TCI) state.

Aspect 27 is the method of any of aspects 19 and 26, where the CMR resource setting includes one or more of at least one non-zero power CSI reference signal (NZP-CSI-RS) resource set with a repetition parameter that is enabled or a synchronization signal block (SSB), where the at least one NZP-CSI-RS resource set includes at least one NZP-CSI-RS resource.

Aspect 28 is the method of any of aspects 19 and 27, where the IMR resource setting includes at least one NZP-CSI-RS resource set with a repetition parameter that is enabled or a CSI interference measurement (CSI-IM) resource set.

Aspect 29 is the method of any of aspects 19 and 28, where the CMR resource setting includes one or more CMR resources and the IMR resource setting includes one or more IMR resources; the one or more CMR resources include one or more CMR subgroups, where each of the one or more CMR subgroups is associated with a TCI state; the one or more IMR resources include one or more IMR subgroups, where each of the one or more IMR subgroups is associated with a TCI state.

Aspect 30 is the method of any of aspects 19 and 29, where the CMR resource setting includes one or more CMR resources and the IMR resource setting includes one or more IMR resources; at least one of the one or more CMR resources or the one or more IMR resources are indicated via one or more CSI-RS resource indicators (CRIs).

Aspect 31 is an apparatus for wireless communication including at least one processor coupled to a memory and configured to implement a method as in any of aspects 19 to 30.

Aspects 32 is the apparatus of aspect 31 further including a transceiver coupled to the at least one processor.

Aspect 33 is an apparatus for wireless communication including means for implementing a method as in any of aspects 19 to 30.

Aspect 34 is a computer-readable medium storing computer executable code, where the code when executed by a processor causes the processor to implement a method as in any of aspects 19 to 30.

What is claimed is:

1. An apparatus for wireless communication at a user equipment (UE), comprising:
- a memory; and
- at least one processor coupled to the memory and configured to:
  - receive a channel state information (CSI) report configuration via radio resource control (RRC) signaling, the CSI report configuration including at least a channel measurement resource (CMR) resource setting, an interference measurement resource (IMR) resource setting, and a report quantity parameter that is disabled;
  - determine a downlink receive beam of one or more downlink receive beams based on the CMR resource setting and the IMR resource setting, wherein the disabled report quantity parameter causes the UE to disable a reporting of the determined downlink receive beam; and
  - communicate with a base station via the downlink receive beam based on the determined downlink receive beam.

2. The apparatus of claim 1, wherein the at least one processor is further configured to:
- calculate a signal-to-interference-plus-noise ratio (SINR) quantity associated with a plurality of downlink transmit beams.

3. The apparatus of claim 2, wherein to determine the downlink receive beam, the at least one processor is configured to determine the downlink receive beam based on the SINR quantity associated with the plurality of downlink transmit beams.

4. The apparatus of claim 2, wherein the CMR resource setting is associated with a first downlink transmit beam of the plurality of downlink transmit beams, and the IMR resource setting is associated with a second downlink transmit beam of the plurality of downlink transmit beams.

5. The apparatus of claim 2, wherein the SINR quantity associated with the plurality of downlink transmit beams is determined based on a resource mapping of one or more CMR resources and one or more IMR resources.

6. The apparatus of claim 1, wherein to determine the downlink receive beam, the at least one processor is configured to determine the downlink receive beam based on at least one signaling condition.

7. The apparatus of claim 6, wherein the at least one signaling condition is implicitly indicated based on at least one of the CMR resource setting with a repetition parameter that is enabled, the IMR resource setting with a repetition parameter that is enabled, or the report quantity parameter.

8. The apparatus of claim 6, wherein the at least one signaling condition is explicitly indicated via at least one of RRC signaling, a medium access control (MAC) control element (MAC-CE), or downlink control information (DCI).

9. The apparatus of claim 1, wherein the CMR resource setting includes one or more of at least one non-zero power CSI reference signal (NZP-CSI-RS) resource set with a repetition parameter that is enabled or a synchronization signal block (SSB), wherein the at least one NZP-CSI-RS resource set includes at least one NZP-CSI-RS resource.

10. The apparatus of claim 1, wherein the IMR resource setting includes at least one NZP-CSI-RS resource set with a repetition parameter that is enabled or a CSI interference measurement (CSI-IM) resource set.

11. The apparatus of claim 1, wherein the CMR resource setting includes one or more CMR resources and the IMR resource setting includes one or more IMR resources.

12. The apparatus of claim 11, wherein the one or more CMR resources include one or more CMR subgroups, wherein each of the one or more CMR subgroups is associated with a TCI state;
- wherein the one or more IMR resources include one or more IMR subgroups, wherein each of the one or more IMR subgroups is associated with a TCI state.

13. The apparatus of claim 11, wherein at least one of the one or more CMR resources or the one or more IMR resources are indicated via one or more CSI-RS resource indicators (CRIs).

14. The apparatus of claim 1, further comprising a transceiver coupled to the at least one processor.

15. A method of wireless communication at a user equipment (UE), comprising:
- receiving a channel state information (CSI) report configuration via radio resource control (RRC) signaling, the CSI report configuration including at least a channel measurement resource (CMR) resource setting, an interference measurement resource (IMR) resource setting, and a report quantity parameter that is disabled;
- determining a downlink receive beam of one or more downlink receive beams based on the CMR resource setting and the IMR resource setting, wherein the disabled report quantity parameter causes the UE to disable a reporting of the determined downlink receive beam; and
- communicating with a base station via the downlink receive beam based on the determined downlink receive beam.

16. An apparatus for wireless communication at a base station, comprising:
- a memory; and
- at least one processor coupled to the memory and configured to:
  - determine a channel state information (CSI) report configuration, the CSI report configuration including at least a channel measurement resource (CMR) resource setting, an interference measurement resource (IMR) resource setting, and a report quantity parameter that is disabled;
  - transmit the CSI report configuration to a user equipment (UE) via radio resource control (RRC) signaling; and
  - communicate with the UE via a downlink receive beam of one or more downlink receive beams based the CMR resource setting and the IMR resource setting, wherein the disabled report quantity parameter causes the UE to disable a reporting of the downlink receive beam.

17. The apparatus of claim 16, wherein the downlink receive beam is based on a signal-to-interference-plus-noise ratio (SINR) quantity associated with a plurality of downlink transmit beams.

18. The apparatus of claim 17, wherein the CMR resource setting is associated with a first downlink transmit beam of the plurality of downlink transmit beams, and the IMR resource setting is associated with a second downlink transmit beam of the plurality of downlink transmit beams.

19. The apparatus of claim 17, wherein the SINR quantity associated with the plurality of downlink transmit beams is based on a resource mapping of one or more CMR resources and one or more IMR resources.

20. The apparatus of claim 16, wherein the downlink receive beam is based on at least one signaling condition.

21. The apparatus of claim 20, wherein the at least one signaling condition is implicitly indicated based on at least one of the CMR resource setting with a repetition parameter that is enabled, the IMR resource setting with a repetition parameter that is enabled, or the report quantity parameter.

22. The apparatus of claim 20, wherein the at least one signaling condition is explicitly indicated via at least one of RRC signaling, a medium access control (MAC) control element (MAC-CE), or downlink control information (DCI).

23. The apparatus of claim 16, wherein a quasi co-location (QCL) type D (QCL-TypeD) parameter for one or more downlink resources is associated with a transmission configuration indication (TCI) state.

24. The apparatus of claim 16, wherein the CMR resource setting includes one or more of at least one non-zero power CSI reference signal (NZP-CSI-RS) resource set with a repetition parameter that is enabled or a synchronization signal block (SSB), wherein the at least one NZP-CSI-RS resource set includes at least one NZP-CSI-RS resource.

25. The apparatus of claim 16, wherein the IMR resource setting includes at least one NZP-CSI-RS resource set with a repetition parameter that is enabled or a CSI interference measurement (CSI-IM) resource set.

26. The apparatus of claim 16, wherein the CMR resource setting includes one or more CMR resources and the IMR resource setting includes one or more IMR resources;

wherein the one or more CMR resources include one or more CMR subgroups, wherein each of the one or more CMR subgroups is associated with a TCI state;

wherein the one or more IMR resources include one or more IMR subgroups, wherein each of the one or more IMR subgroups is associated with a TCI state.

27. The apparatus of claim 16, wherein the CMR resource setting includes one or more CMR resources and the IMR resource setting includes one or more IMR resources;

wherein at least one of the one or more CMR resources or the one or more IMR resources are indicated via one or more CSI-RS resource indicators (CRIs).

28. The apparatus of claim 16, further comprising a transceiver coupled to the at least one processor.

29. A method of wireless communication at a base station, comprising:

determining a channel state information (CSI) report configuration, the CSI report configuration including at least a channel measurement resource (CMR) resource setting, an interference measurement resource (IMR) resource setting, and a report quantity parameter that is disabled;

transmitting the CSI report configuration to a user equipment (UE) via radio resource control (RRC) signaling; and communicating with the UE via a downlink receive beam of one or more downlink receive beams the CMR resource setting and the IMR resource setting, wherein the disabled report quantity parameter causes the UE to disable a reporting of the downlink receive beam.

* * * * *